United States Patent [19]
Li et al.

[11] Patent Number: 5,798,515
[45] Date of Patent: *Aug. 25, 1998

[54] OPTICAL SCANNER WITH FAST ZOOM CAPABILITY AND SCANNING SYSTEM

[75] Inventors: Yajun Li, Oakdale; Edward Barkan, Miller Place, both of N.Y.

[73] Assignee: Symbol Technologies, Inc., Holtsville, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 627,168

[22] Filed: Apr. 3, 1996

[51] Int. Cl.⁶ .................................................. G06G 7/10
[52] U.S. Cl. ........................... 235/472; 235/454; 235/455
[58] Field of Search .............................. 235/472, 454, 235/455; 359/672, 673, 674, 675

[56] References Cited

U.S. PATENT DOCUMENTS

| | | | |
|---|---|---|---|
| 2,531,956 | 11/1950 | Waldorf et al. | 359/673 |
| 3,897,138 | 7/1975 | Kano | 359/674 |
| 3,936,150 | 2/1976 | Ikeda | 359/672 |
| 4,251,798 | 2/1981 | Swartz et al. | |
| 4,369,361 | 1/1983 | Swartz et al. | |
| 4,387,297 | 6/1983 | Swartz et al. | |
| 4,409,470 | 10/1983 | Shepard et al. | |
| 4,443,067 | 4/1984 | Owen, Jr. et al. | 359/675 |
| 4,466,707 | 8/1984 | Ikemori et al. | 359/674 |
| 4,760,248 | 7/1988 | Swartz et al. | |
| 4,896,026 | 1/1990 | Krichever et al. | |
| 5,170,277 | 12/1992 | Band et al. | 235/472 |
| 5,243,655 | 9/1993 | Wang | |
| 5,304,786 | 4/1994 | Pavlidis et al. | |
| 5,331,176 | 7/1994 | Sant'Anselmo et al. | 235/472 |
| 5,378,883 | 1/1995 | Batterman et al. | 235/472 |
| 5,386,107 | 1/1995 | Dvorkis et al. | 235/472 |
| 5,576,529 | 11/1996 | Koenck et al. | 235/472 |

*Primary Examiner*—Harold Pitts

[57] ABSTRACT

A bar code scanner comprises a first collection optical system having an optical axis and a first magnification, a detector disposed along the optical axis and in optical communication with the first collection optical system, a second collection optical system having a second magnification greater than the first magnification and having an optical axis and displacing means operable for selectively moving the second collection optical system to dispose the optical axis thereof in coincidence with the optical axis of the first collection optical system.

16 Claims, 3 Drawing Sheets

OPTICAL SCANNER WITH FAST ZOOM CAPABILITY AND SCANNING SYSTEM

FIELD OF THE INVENTION

The present invention relates generally to an optical scanner and more particularly pertains to an optical scanner having capability for selectively introducing enhanced image magnification in the course of scanning bar codes.

DESCRIPTION OF THE RELATED ART

Various optical readers and optical scanning systems have been developed heretofore for reading bar code symbols appearing on a label or on the surface of an article. The bar code symbol itself is a coded pattern of indicia comprised of a series of bars of various widths spaced apart from one another to bound spaces of various widths, the bars and spaces having different light reflecting characteristics. The readers and scanning systems electro-optically transform the graphic indicia into electrical signals, which are thereafter decoded into alphanumeric characters that are intended to be descriptive of the article or some characteristic thereof. Such characters are typically represented in digital form and utilized as an input to a data processing system for applications in point-of-sale processing, inventory control, and the like. Scanning systems of this general type have been disclosed, for example, in U.S. Pat. Nos. 4,251,798; 4,369,361; 4,387,297, 4,409,470; 4,760,248; and 4,896,026, all of which have been assigned to the same assignee as the instant application.

As disclosed in some of the above patents, one embodiment of such a scanning system resides, inter alia, in a hand-held, portable scanning head supported by a user, which is configured to allow the user to aim the head, and more particularly, a light beam, at a target and a symbol to be read.

The light source in a laser scanner is typically a gas laser or semiconductor laser. The use of a semiconductor devices such as a laser diode as the light source in scanning systems is especially desirable because of their small size, low cost and low power requirements. The beam is optically modified, typically by optical elements, such as lenses, mirrors, apertures, etc., to form a beam spot of a certain size at the target distance. It is preferred that the beam spot size at the target distance be approximately the same as the minimum width between regions of different light reflectivity, i.e., the bars or spaces of the symbol.

Bar code symbols are formed from bars or elements that are typically rectangular in shape with a variety of possible widths. The specific arrangement of elements defines the character represented according to a set of rules and definitions specified by the code or "symbology" used. The relative size of the bars and spaces is determined by the type of coding used, as is the actual size of the bars and spaces. The narrowest bar/space of a bar code symbol determines the number of characters per millimeter or per inch and is referred to as the density of the symbol. To encode a desired sequence of characters, element arrangements are concatenated together to form the complete bar code symbol, with each character of the message being represented by its own corresponding group of elements. In some symbologies a unique "start" and "stop" character is used to indicate where the bar code begins and ends, thus defining the pattern to be decoded/identified. A number of different bar code symbologies exist. These symbologies include UPC/EAN, Code 39, Code 128, Codabar, and Interleaved 2 of 5, among others.

A further known symbology is known as two-dimensional (2D) symbology and is discussed in detail in commonly-assigned U.S. Pat. No. 5,243,655 and No. 5,304,786, which are incorporated herein by this reference thereto. Briefly, that symbology involves a variable number of component symbols or "codewords" per row of a nonvolatile electro-optical read-only memory imprinted on a substrate. Codewords in alternating rows are selected from mutually exclusive subsets of a mark pattern, the subsets being defined in terms of particular values of a discriminator function which is illustrated in the referenced patents as being a function of the widths of bars and spaces in a given codeword.

In the scanning systems known in the art, the light beam is directed by a lens or similar optical components along a light path toward a target that includes a bar code symbol on the surface. The scanning systems function by repetitively scanning the light beam in a line or series of lines across the symbol. The scanning component may either sweep the beam spot across the symbol and trace a scan line across the past the symbol, or scan the field of view of the scanner, or do both.

Scanning systems also include a sensor or photodetector which functions to detect light reflected from the symbol. The photodetector is therefore positioned in the scanner or in an optical path in which it has a field of view which extends across and slightly past the symbol. A portion of the reflected light which is reflected off the symbol is detected and converted into an electrical signal. Electronic circuitry or software thereafter decodes the electrical signal into a digital representation of the data represented by the symbol that has been scanned. For example, the analog electrical signal from the photodetector may typically be converted into a pulse width modulated digital signal, with the widths corresponding to the physical widths of the bars and spaces. Such a signal is then decoded according to the specific symbology into a binary representation of the data encoded in the symbol, and to the alphanumeric character so represented.

The decoding process in known scanning systems usually works in the following way. The decoder receives the pulse width modulated digital signal from the scanner, and an algorithm implemented in software attempts to decode the scan. If the start and stop characters and the characters between them in the scan were decoded successfully and completely, the decoding process terminates and an indicator of a successful read (such as a green light and/or an audible beep) is provided to the user. Otherwise, the decoder receives the next scan, performs another decode attempt on that scan, and so on, until a completely decoded scan is achieved or no more scans are available.

Decoding in 2D symbology is discussed particularly and shown in various flowcharts set forth in the 2D symbology patents incorporated by reference and above identified.

Another type of bar code reader is one which incorporates a detector based upon charge coupled device (CCD) technology. CCDs consist of an array of many detectors, commonly referred to as "pixels". The entire symbol is flooded with light from the reader or ambient light, and each pixel is sequentially read out to determine the presence of a bar or a space. Such readers are light-weight and easy to use, but require substantially direct contact or placement of the reader on the symbol to enable the symbol to be properly read. Such physical contact of the reader with the symbol is a preferred mode of operation for many applications, or as a matter of personal preference by the user.

A basic figure of merit in scanning CCD arrays is a so-called "pixels per module" detection. If detection capability falls below such figure of merit, scanning cannot proceed in that requisite sensitivity is not present.

SUMMARY OF THE INVENTION

A primary object of the present invention is to provide an optical scanner and scanning system including magnification capacity selectively and quickly operable in the event that pixels per module discernment is less than a predetermined level.

In attaining the foregoing and other objects, the invention provides a bar code scanner comprising a first collection optical system having an optical axis and a first magnification, a detector disposed along the optical axis and in optical communication with the first collection optical system, a second collection optical system having a second magnification greater than the first magnification and having an optical axis and displacing means operable for selectively moving the second collection optical system to dispose the optical axis thereof in coincidence with the optical axis of the first collection optical system.

In its system aspect, the invention provides the described bar code scanner with circuit means responsive to output signals of the detector for controlling operation of the displacing means.

Viewed more broadly, the invention provides a bar code scanner having a scanning optical axis, comprising first and second collection optical systems and support means for supporting the first collection optical system fixedly in registry with the scanning optical axis and supporting the second collection optical system for movement from a first position in non-registry with the scanning optical axis to a second position in registry with the scanning optical axis.

BRIEF DESCRIPTION OF THE DRAWINGS

The foregoing objects and advantages of the present invention may be more readily understood by one skilled in the art with reference being had to the following detailed description of preferred embodiments thereof, taken in conjunction with the accompanying drawings wherein like elements are designated by identical reference numerals throughout the several views, and in which.

DETAILED DESCRIPTION OF PREFERRED EMBODIMENTS AND PRACTICES

Figure 1:
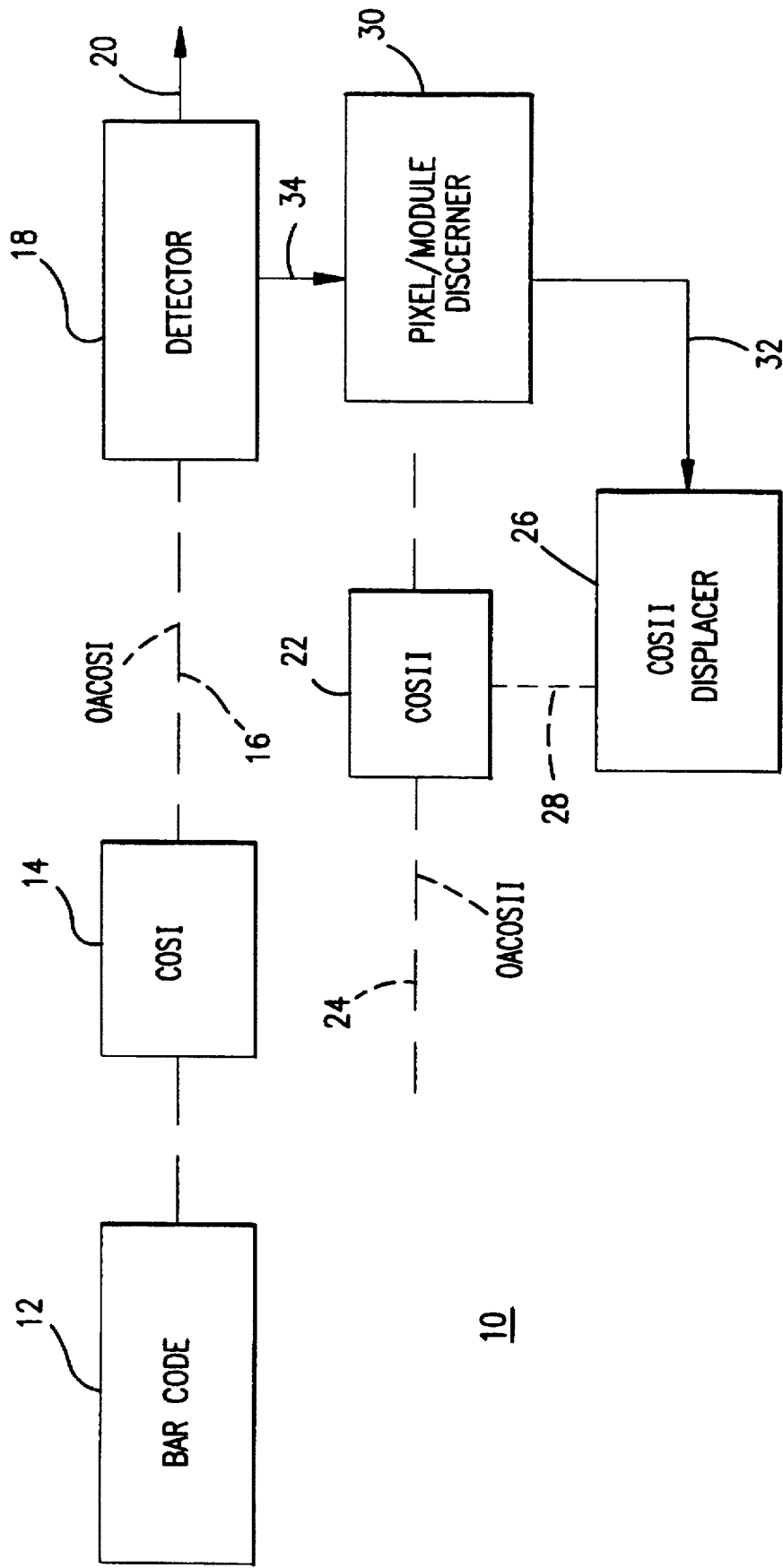
FIG. 1 is a functional block diagram of a scanning system in accordance with the invention.

Referring to FIG. 1, system 10 of the invention for reading bar code 12 has a normally-operating channel comprising first collection optical system (COSI) 14 having optical axis (OACOSI) 16 and DETECTOR 18, which is constituted by a CCD array incorporating pixels, the detector providing output signals indicative of scanned bar codes on lines 20.

System 10 further includes a selectively-operating channel comprising second collection optical system (COSII) 22 having optical axis (OACOSII) 24 and COSII DISPLACER 26, which mechanically translates second collection optical system 22 by input shown at 28. Displacer 26 of the selectively-operating channel is controlled by PIXEL PER MODULE DISCERNER 30 through signals provided on line 32. Discerner 30 itself receives input information from detector 18 over lines 34.

In normal system operation, i.e., when the pixels per module discernment is equal to or greater than a predetermined level, second channel components 22 and 26 are quiescent. On the other hand, when the pixels per module discernment is less than the predetermined level, discerner 30 activates displacer 26, which in turn translates second collection optical system 22 such that its optical axis 24 is placed in coincidence with optical axis 16 of first collection optical system 14.

Second collection optical system 22 has an optical magnification which is greater than the magnification of first collection optical system 14, i.e., the former is a zoom collection optical system. Given the greater magnification of the second collection optical system, system 10 accordingly experiences a higher capacity for meeting the pixel per module predetermined level and bar code scanning can accordingly proceed with use of the zoom facility.

Figure 2:
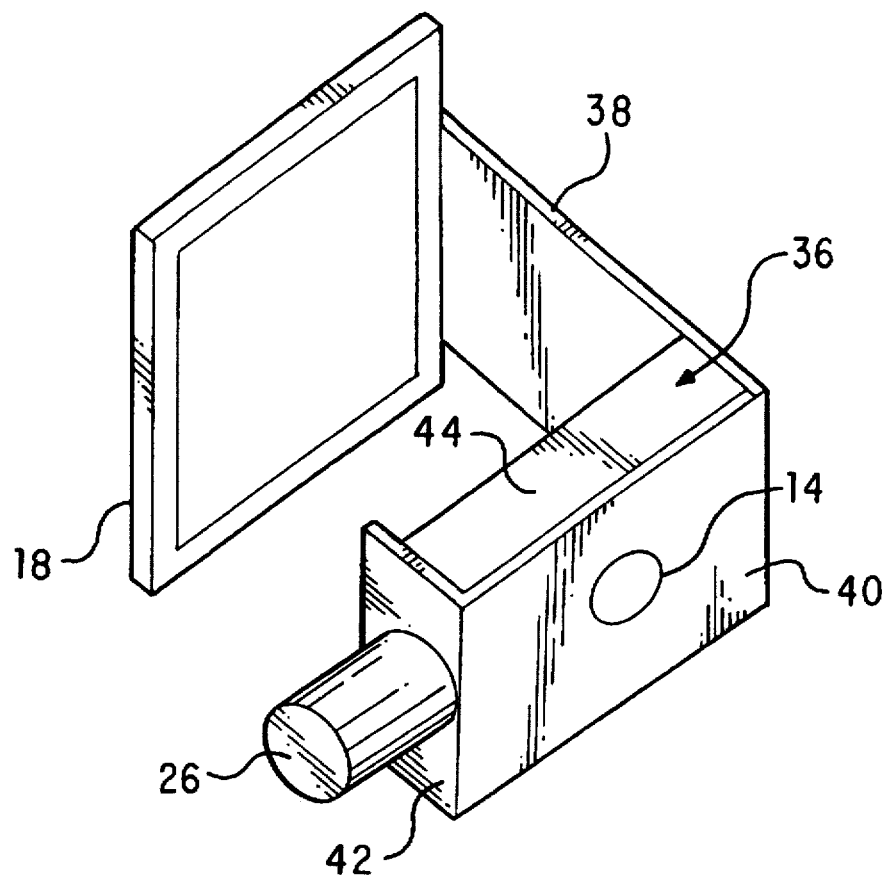
FIG. 2 is a perspective view of a scanner in accordance with the invention.

Turning to FIG. 2, scanning apparatus in accordance with the invention includes assembly 36, below discussed, supported by plate member 38, which is secured to detector 18 and also supports first collection optical system 14, shown as a single lens, disposed in apparatus front wall 40. Detector 18 may be a CCD available commercially as SONY ICX044, ICX045(510×492). The single lens may be a commercially-available CCD Board Camera Lens, e.g., CHINON 8 mm, F1—8 Minilens. Left sidewall 42 supports displacer 26, which may be an electrical solenoid.

Figure 3:
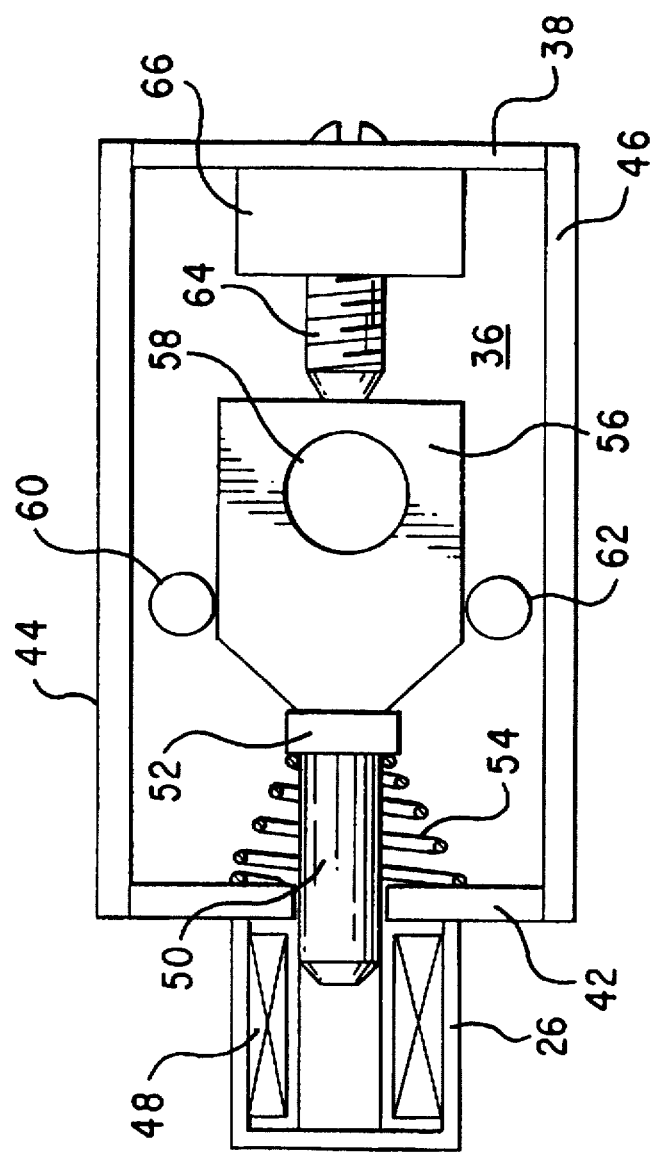
FIG. 3 is a front elevation of the displacement means and the second collection optical system of the scanner of FIG. 2.

In FIG. 3., assembly 36 is shown as it would be seen rearwardly of front wall 40 of FIG. 2. Solenoid 26 will be seen to include coil 48 and plunger 50. Collar 52 is secured to plunger 50 and is engaged by compression spring 54, the collar itself securing transparent sheet member 56 to plunger 50 to be displaced therewith. Sheet member 56 has plastic lens 58 formed integrally therewith and is guided by guide rolls 60 and 62, disposed interiorly of assembly 36 ceiling 44 and floor 46. Plate member 38 has adjustment screw 64 extending therethrough into threaded engagement with nut 66 which is fixed to member 38.

Figure 4:
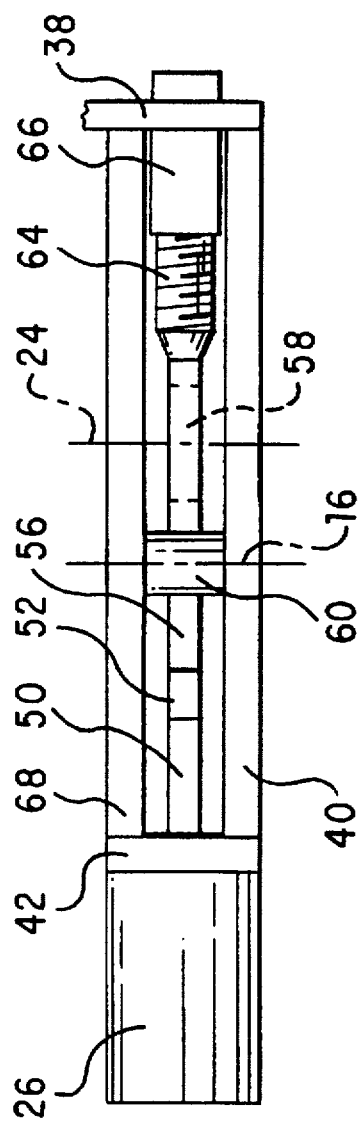
FIG. 4 is a partial plan view of the scanner of FIG. 2.

In FIG. 4, the FIG. 3 assembly is seen from above, with ceiling 44 and spring 54 omitted. Guide rolls 60 and 62 are supported by transparent rear wall 68. Optical axis 16 of lens 14 (FIG. 2) is disposed generally in registry with guide rolls 60 and 62 and, more particularly in registry with expanse of transparent sheet member 56 not including lens 58, i.e., lens 14 thus communicating optically through member 56 and rear wall 68 with detector 18 of FIG. 2. Such positioning of member 56 is effected by adjustment screw 64.

When solenoid coil 48 is energized, solenoid plunger 50 is pulled leftwardly in FIG. 3, overcoming the bias of spring 54 and accordingly placing lens 58 in registry with lens 14 of FIG. 2, i.e., optical axis 24 of FIG. 4 moves leftwardly into coincidence with optical axis 16. The apparatus is thus placed in zoom condition, with lenses 14 and 58 in optical communication with detector 18.

By way of summary and introduction to the ensuing claims, the invention will be seen to provide, in its system and apparatus aspects, a bar code scanner comprising a first collection optical system having an optical axis and a first magnification, a detector disposed along the optical axis and in optical communication with the first collection optical system, a second collection optical system having a second magnification greater than the first magnification and having an optical axis and displacing means operable for selectively moving the second collection optical system to dispose the optical axis thereof in coincidence with the optical axis of the first collection optical system.

Circuit means is responsive to output signals of the detector for controlling operation of the displacing means.

The detector comprises an array of pixels and the circuit means operates the displacing means upon the detector output signals indicating that less than a predetermined number of the detector pixels are detected by the detector means.

The displacing means includes first means, e.g., a compression spring, for biasing the second collection optical system such that the optical axis thereof is not coincident with the optical axis of the first collection optical system. The displacing means includes second means, e.g., an electrical solenoid, for overcoming the bias of the first means and effecting such selective movement of the second collection optical system to dispose the optical axis thereof in coincidence with the optical axis of the first collection optical system.

The first collection optical system comprises a focusing lens and the second optical system comprises a zoom lens and a support therefor, the support defining a transparent portion in registry with the optical axis of the first collection system when the displacing means is not operated.

Viewed more generally, the invention provides a bar code scanner having an scanning optical axis, comprising first and second collection optical systems and support means for supporting the first collection optical system fixedly in registry with the scanning optical axis and supporting the second collection optical system for movement from a first position in non-registry with the scanning optical axis to a second position in registry with the scanning optical axis. The support means supports the second collection optical system for movement generally orthogonally to the scanning optical axis. The support means comprises means continuous operable for biasing the second collection optical system into the non-registry position and means selectively operable for moving the second collection optical system into the registry position.

While preferred system and apparatus embodiments of the present invention for an optical scanner are described in detail herein, it should be apparent that the disclosure and teachings of the present invention will suggest many alternative designs to those skilled in the art.

What is claimed is:

1. A bar code scanner comprising:
   (a) a first collection optical system having a first collection optical axis and a first magnification;
   (b) an optical detector disposed along said first collection optical axis and in optical communication with said first collection optical system;
   (c) a second collection optical system having a second magnification greater than said first magnification and having a second collection optical axis; and
   (d) an automatic insertion mechanism operable for selectively inserting said second collection optical system along a direction normal to said first collection optical axis to dispose said second collection optical axis thereof in coincidence with said first collection optical axis of said first collection optical system, wherein activation of said insertion mechanism is dependent upon an output of the detector and a combination of said first and said second collection optical systems produces a required system magnification for discerning a bar code image on the optical detector.

2. The bar code scanner claimed in claim 1, further comprising a circuit responsive to output signals of said detector for controlling operation of said insertion mechanism.

3. The bar code scanner claimed in claim 2, wherein said detector comprises an array of pixels and wherein said circuit operates said insertion mechanism when said detector output signals indicate that less than a predetermined number of said detector pixels are detected to correspond to a bar code module.

4. The bar code scanner claimed in claim 1, wherein said insertion mechanism includes first means for biasing said second collection optical system such that the collection optical axis thereof is not coincident with said first collection optical axis of said first collection optical system.

5. The bar code scanner claimed in claim 4, wherein said insertion mechanism includes second means for overcoming the bias of said first means and effecting such selective movement of said second collection optical system to dispose the second collection optical axis thereof in coincidence with said first collection optical axis of said first collection optical system.

6. The bar code scanner claimed in claim 4, wherein said first means comprises a spring member.

7. The bar code scanner claimed in claim 5, wherein said second means comprises an electrical solenoid.

8. The bar code scanner claimed in claim 6, wherein said second means comprises an electrical solenoid.

9. The bar code scanner claimed in claim 1, wherein said first collection optical system comprises a focusing lens and wherein said second optical system comprises a zoom lens and a support therefor, said support defining a transparent portion in registry with said first collection optical axis of said first collection system when said displacing means is not operated.

10. A bar code scanner having a scanning optical axis, comprising a first and a second collection optical systems having different magnifications and support means for supporting said first collection optical system fixedly in registry with said scanning optical axis and supporting said second collection optical system for automatic movement in a direction normal to said scanning optical axis from a first position in non-registry with said scanning optical axis to a second position in registry with said scanning optical axis;
   wherein the movement of said support means is dependent upon an output of an optical detector and a combination of said first and said second collection optical systems produces a required system magnification for discerning a bar code image on said optical detector.

11. The bar code scanner claimed in claim 10, wherein said support means comprises means continuously operable for biasing said second collection optical system into said non-registry position.

12. The bar code scanner claimed in claim 10, wherein said support means comprises means selectively operable for moving said second collection optical system into said registry position.

13. The bar code scanner claimed in claim 10, wherein said support means comprises first means continuously operable for biasing said second collection optical system into said non-registry position and second means selectively operable for moving said second collection optical system into said registry position.

14. The bar code scanner claimed in claim 13, wherein said first means comprises a spring member.

15. The bar code scanner claimed in claim 13, wherein said second means comprises an electrical solenoid.

16. The bar code scanner claimed in claim 14, wherein said second means comprises an electrical solenoid.

* * * * *